(12) United States Patent
Guyomard

(10) Patent No.: US 6,571,898 B2
(45) Date of Patent: Jun. 3, 2003

(54) DEVICE FOR MOUNTING EQUIPMENT, IN PARTICULAR A HEAT-EXCHANGE MODULE, ONTO A MOTOR VEHICLE

(75) Inventor: Jean-Nicolas Guyomard, Fuguet (FR)

(73) Assignee: Valeo Thermique Moteur, La Verriere (FR)

( * ) Notice: Subject to any disclaimer, the term of this patent is extended or adjusted under 35 U.S.C. 154(b) by 64 days.

(21) Appl. No.: 09/739,299

(22) Filed: Dec. 19, 2000

(65) Prior Publication Data

US 2001/0019098 A1 Sep. 6, 2001

(30) Foreign Application Priority Data

Dec. 20, 1999 (FR) .............................. 99 16080

(51) Int. Cl.⁷ ............................................... F16M 13/00
(52) U.S. Cl. .................... 180/68.4; 248/562; 248/634; 165/69; 165/76
(58) Field of Search ............................ 180/68.4, 68.5, 180/68.6, 312; 248/232, 634, 635, 74.1; 292/562, 251, DIG. 16; 165/41, 67, 69, 148, 76

(56) References Cited

U.S. PATENT DOCUMENTS

| 2,216,663 A | * | 10/1940 | Fogle ......................... 180/68.5 |
| 2,225,592 A | * | 12/1940 | MacFadden ................. 248/361 |
| 2,979,146 A | * | 4/1961 | Fogle ......................... 180/68.5 |
| 3,121,467 A | | 2/1964 | Bryant ....................... 180/68.4 |
| 3,340,948 A | * | 9/1967 | Deckert et al. ............ 180/68.4 |
| 3,700,061 A | * | 10/1972 | Hortnagl .................... 180/68.4 |
| 4,121,682 A | * | 10/1978 | Schaal et al. .............. 180/68.4 |
| 4,538,697 A | * | 9/1985 | Muroi et al. ................ 180/68.4 |
| 4,579,184 A | * | 4/1986 | Hiramoto .................... 180/68.4 |
| 4,662,432 A | | 5/1987 | Suzuki ........................ 165/41 |
| 4,773,496 A | | 9/1988 | Brielmair .................... 180/68.4 |
| 5,205,349 A | * | 4/1993 | Nagao et al. .................. 165/67 |
| 5,269,367 A | * | 12/1993 | Susa et al. ..................... 165/41 |
| 5,341,871 A | * | 8/1994 | Stelzer ........................ 165/121 |
| 5,484,667 A | * | 1/1996 | Sahli et al. .................. 429/100 |
| 5,544,714 A | | 8/1996 | May et al. .................. 180/68.4 |
| 5,605,200 A | * | 2/1997 | Mayberry et al. .......... 180/68.4 |
| 6,216,810 B1 | * | 4/2001 | Nakai et al. ................ 180/68.4 |
| 6,315,257 B1 | * | 11/2001 | Fennesz ...................... 248/232 |
| 6,349,928 B1 | * | 2/2002 | Ko ............................ 267/141.4 |
| 2001/0019098 A1 | * | 9/2001 | Guyomard .................. 248/562 |

FOREIGN PATENT DOCUMENTS

| DE | 1611369 | 7/1950 |
| DE | 2035306 | 1/1972 |
| DE | 8430600 | 6/1994 |

OTHER PUBLICATIONS

Patent Abstracts of Japan, Pub. No. 62274123, Pub. Date Nov. 28, 1987.

* cited by examiner

Primary Examiner—Brian L. Johnson
Assistant Examiner—James A Shriver
(74) Attorney, Agent, or Firm—Liniak, Berenato & White

(57) ABSTRACT

The mounting device has at least two receiving blocks on a load-bearing structure, each block having two face-to-face parallel ribs, as well as at least two damping studs. Each is produced from an elastically deformable material and includes two parallel grooves able to interact, by sliding, with the two parallel ribs of a receiving block. Each damping stud also has a bearing face suitable for interacting with an item of equipment, as well as having an abutment face suitable for interacting with the receiving block.

14 Claims, 2 Drawing Sheets

DEVICE FOR MOUNTING EQUIPMENT, IN PARTICULAR A HEAT-EXCHANGE MODULE, ONTO A MOTOR VEHICLE

FIELD OF THE INVENTION

The invention relates to the mounting of motor-vehicle equipment. It relates more particularly to a device for mounting equipment, in particular a heat-exchange module, onto a load-bearing structure of a motor vehicle.

BACKGROUND OF THE INVENTION

Such a heat-exchange module, in its simplest version, usually comprises a heat exchanger such as the radiator for cooling the engine of the vehicle. Such a module may, moreover, comprise at least one other heat exchanger, for example an air-conditioning condenser, and, if appropriate, at least one motor-driven fan unit suitable for generating an airflow passing through the heat exchanger or exchangers making up the module.

This module has to be mounted on a load-bearing structure of the motor vehicle, that is to say generally either on an upper beam and a lower beam forming part of the body shell of the vehicle, or else on a front facade, ready to be mounted onto the vehicle by the constructor.

It will recalled that such a facade is a structural element of the vehicle, which is capable of incorporating various pieces of equipment of the vehicle, such as headlights, flashers, audible warning device, heat exchanger, motor-driven fan unit or complete cooling module, etc.

The heat-exchange module has to be fixed to the load-bearing structure by means capable of absorbing the vibration and of compensating for the variations in dimensions due to thermal expansion.

Up to the present, the heat-exchange module has been fixed onto the load-bearing structure of the vehicle by means of deformable studs, generally comprising two studs of a first type placed at the lower part of the module and two studs of another type, placed at the upper part of the module.

These studs are usually mounted onto spigots projecting from the manifolds of a heat exchanger of the module, which makes it necessary to provide manifolds of a particular type, and presents the risk that these spigots may be damaged accidentally.

Moreover, mechanical fixing means, such as pins, have to be provided, which are affixed in order to achieve locking between the studs and the load-bearing structure.

Consequently, this known mounting technique needs affixed elements to be put in place, implying additional costs because of the necessity to provide the supplementary pieces and the time necessary to mount them in the assembly process.

The object of the invention is especially to surmount the abovementioned drawbacks.

It envisages, in particular, proposing a mounting device making it possible to reduce the number of pieces necessary for assembly and to ensure rapid mounting.

SUMMARY OF THE INVENTION

According to the present invention there is provided a device for mounting equipment, in particular a heat-exchange module, onto a load-bearing structure of a motor vehicle, which comprises at least two receiving blocks provided on the load-bearing structure and each comprising two face-to-face parallel ribs, as well as at least two damping studs each of which is produced from an elastically deformable material and includes two parallel grooves opening out on two opposite side faces and able to interact, by sliding, with the two parallel ribs of a receiving block, each damping stud further comprising a bearing face suitable for interacting with the equipment and an abutment face suitable for interacting with the receiving block.

Hence, the equipment is mounted in a particularly simple way, by virtue of damping studs being interposed between the equipment and the receiving blocks provided on the load-bearing structure.

The receiving blocks are put in place simply by sliding, by cooperation between the grooves of each damping stud and the corresponding ribs of the receiving block which is to receive it.

This solution does not require spigots to be provided on the manifolds of the heat exchanger, nor elements affixed for immobilizing the damping studs.

In one embodiment of the invention, the damping stud comprises a body in which the grooves are formed, and a lateral elongation attached to the body and contributing to defining the bearing face and the abutment face.

According to another characteristic of the invention, the grooves of the damping stud and the ribs of the receiving block have cross sections of complementary shapes which are suitable for frictional interaction.

The damping stud may comprise at least one retaining tooth formed in projection in a groove and able to come to bear against a rib of the receiving block in order to contribute to immobilizing the damping stud with respect to the receiving block.

The damping stud may equally comprise at least one recess suitable for increasing the flexibility in at least one chosen region.

The damping stud is advantageously formed from a material of the rubber or elastomer type, or the like.

According to another characteristic of the invention, the two ribs of the receiving block are attached to two opposite side walls, suitable for framing the two opposite side faces of a damping stud.

Advantageously, the two opposite side walls of the receiving block are attached perpendicularly to a back wall which forms an abutment for the damping stud. These two opposite side walls are preferably attached to a third side wall, which is itself attached perpendicularly to the back wall.

In one preferred embodiment of the invention, the device comprises at least one receiving block provided on an upper crosspiece of the load-bearing structure and at least one receiving block provided on a lower crosspiece of the load-bearing structure. The upper crosspiece and the lower crosspiece preferably form part of a front facade.

In a variant, these crosspieces may form part of the actual structure of the vehicle.

In one preferred embodiment of the invention, the device comprises four receiving blocks the respective ribs of which are parallel and four damping studs suitable for interacting respectively with these four receiving blocks.

Advantageously, the device further comprises means for fixing the equipment to the load-bearing structure. These fixing means preferably comprise clipping lugs projecting from the load-bearing structure and interacting with complementary parts projecting from the equipment.

BRIEF DESCRIPTION OF THE DRAWINGS

In the description which follows, given solely by way of example, reference is made to the attached drawings, in which.

DESCRIPTION OF THE PREFERRED EMBODIMENT

Figure 1:
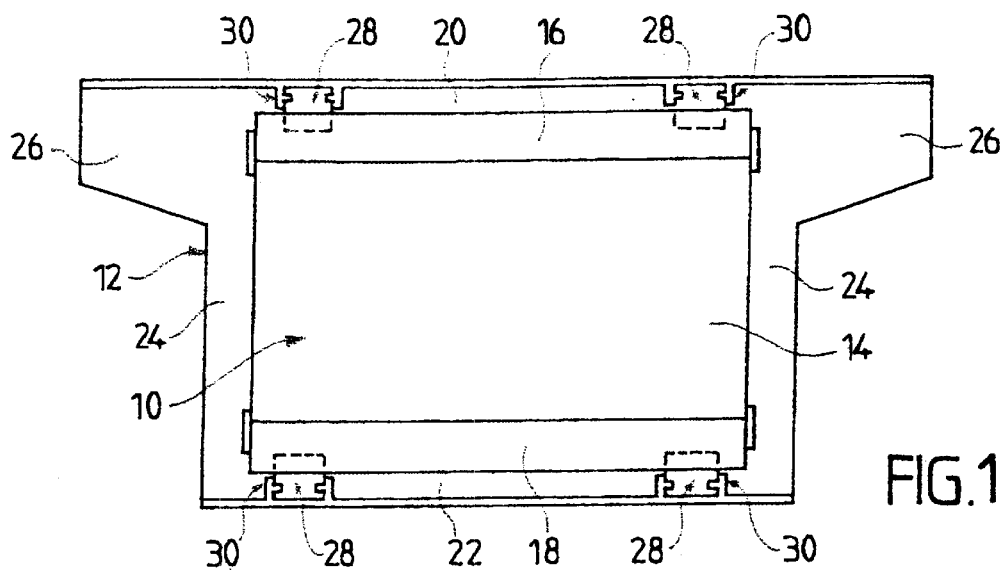
FIG. 1 is a front view of a heat-exchange module mounted on a motor-vehicle load-bearing structure by a device according to the invention.

In the various figures, like reference numerals refer to like parts.

In FIG. 1 is represented a heat-exchange module 10, mounted and fixed onto a load-bearing structure 12 of a motor vehicle.

The module 10 here consists of a radiator for cooling the engine of the vehicle, this radiator comprising a tube bank 14 mounted between an upper manifolds 16 and a lower manifold 18.

The cooling radiator in itself constitutes a cooling module, to which may be added another heat exchanger, such as an air-conditioning condenser, for example.

The load-bearing structure 12 is implemented here in the form of a front facade, that is to say of a structural element additionally capable of incorporating other items of equipment such as headlights, flashers, audible warning device, heat exchanger, motor-driven fan units, etc.

The load-bearing structure 12 comprises a substantially horizontal upper crosspiece 20, a substantially horizontal lower crosspiece 22 and two vertical uprights 24 linking the crosspieces 20 and 22.

The load-bearing structure 12 further comprises two lateral parts 26 suitable for providing for it to be mounted either on length pieces (not represented) of the body shell of the vehicle, or for accommodating equipment related to the vehicle, such as optical units of headlights.

The module 10 is mounted on the load-bearing structure 12 by means of four damping studs 28 engaging respectively in four receiving blocks 30 projecting from the load-bearing structure 12. More particularly, the mounting device comprises two receiving blocks 30 projecting from the upper crosspiece 20 and respectively carrying two damping studs 28 suitable for bearing on the upper manifold 16, as well as two other receiving blocks 30 projecting from the lower crosspiece 22 and suitable respectively for receiving two damping studs 28 bearing against the lower manifold 18.

Figure 2:
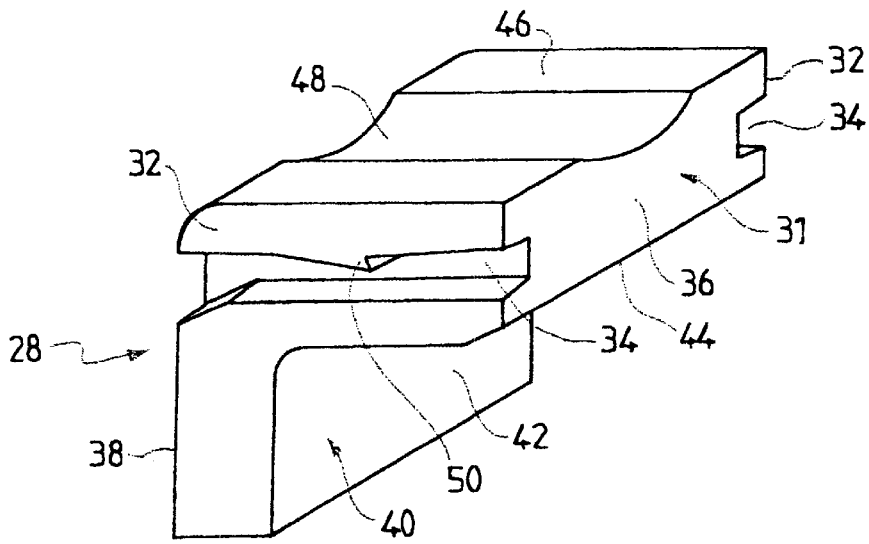
FIG. 2 is a view in perspective of a damping stud.

The structure of a damping stud 28 will now be described by reference to FIG. 2. The stud 28 is produced, in the example described, in a single piece made from an elastically deformable material, which may be natural or synthetic rubber, for example, or an elastomer material.

The damping stud 28 comprises a body 31, of generally rectangular-box shape, featuring two opposite side faces 32 into which two grooves 34 of rectangular cross section open out, which extend parallel to each other and parallel to the faces 32. These grooves 34 extend from a front face 36 back to a rear face 38.

Moreover, the stud 28 comprises a lateral extension 40 of generally rectangular-box shape, which is attached to the body 31 and is delimited, on one side, by the abovementioned rear face 38. On the opposite side, the lateral extension 40 is delimited by a face 42 which is connected at right angles to a face 44 of the body 31. These faces 42 and 44 form a bearing surface with a bent shape matching the shape of the manifold 16 or 18 of the module 10. On the opposite side to the face 44, the body 31 possesses an upper face 46 which includes a central recess 48.

Moreover, the damping stud 28 comprises a retaining tooth 50 formed in projection in a groove 34. The stud may comprise either a single retaining tooth, or two retaining teeth, the function of which will be explained later.

Figure 3:
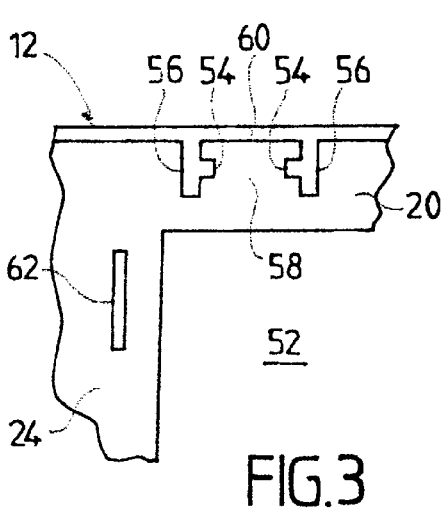
FIG. 3 is a partial view, on an enlarged scale, of the load-bearing structure in the region of a receiving block.
Figure 4:
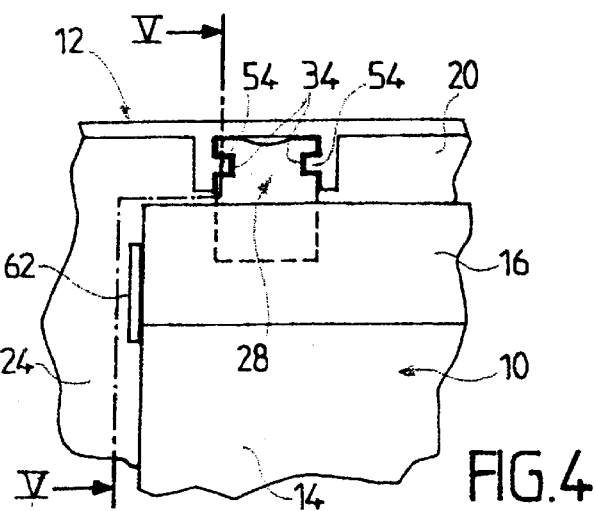
FIG. 4 is a view similar to FIG. 3 after a damping stud has been put in place and the equipment mounted.

FIG. 3 will now be referred to to describe a part of the load-bearing structure 12. A part of the upper crosspiece 20 and a part of a vertical upright 24 are seen in FIG. 3. It will be understood that the two crosspieces 20 and 22 and the two uprights 24 form a frame delimiting a central aperture 52, of generally rectangular shape, matching the shape of the body 14 of the module 10, so as to allow an airflow to sweep the tube bank 14 and to pass through the aperture 52.

The receiving block 30 comprises two face-to-face parallel ribs 54 which extend parallel to each other and perpendicularly to the plane of the load-bearing structure 12. These ribs 54 are intended to interact by sliding with the grooves 34 of a block in order to allow it to be held in position with respect to the load-bearing structure 12. The ribs 54 and the grooves 34 have cross sections of complementary shapes and are able to interact under friction.

The two ribs 54 of the receiving block 30 are attached to two opposite side walls 56 suitable for framing the two side faces 32 of a damping stud 28. The side walls 56 are attached perpendicularly to a back wall 58 of the receiving block, this back wall being formed directly on the upper crosspiece 20.

Moreover, the two side walls 56 are attached to a third side wall 60 which is itself attached perpendicularly to the back wall 58. It will be understood that the two side walls 56 carrying the ribs 54, as well as the side wall 60 and the back wall 58 define a housing with a shape matching a stud 28. When this stud is inserted into the housing thus defined, the rear face 38 comes to bear against the back wall 58 and the upper face 46 comes to bear against the side wall 60, so that this stud is completely immobilized. Moreover, the teeth 50 of the stud 28 come to bear against the corresponding rib or ribs of the receiving block 30 so as to contribute to immobilizing the stud in position.

Figures 5, 6:
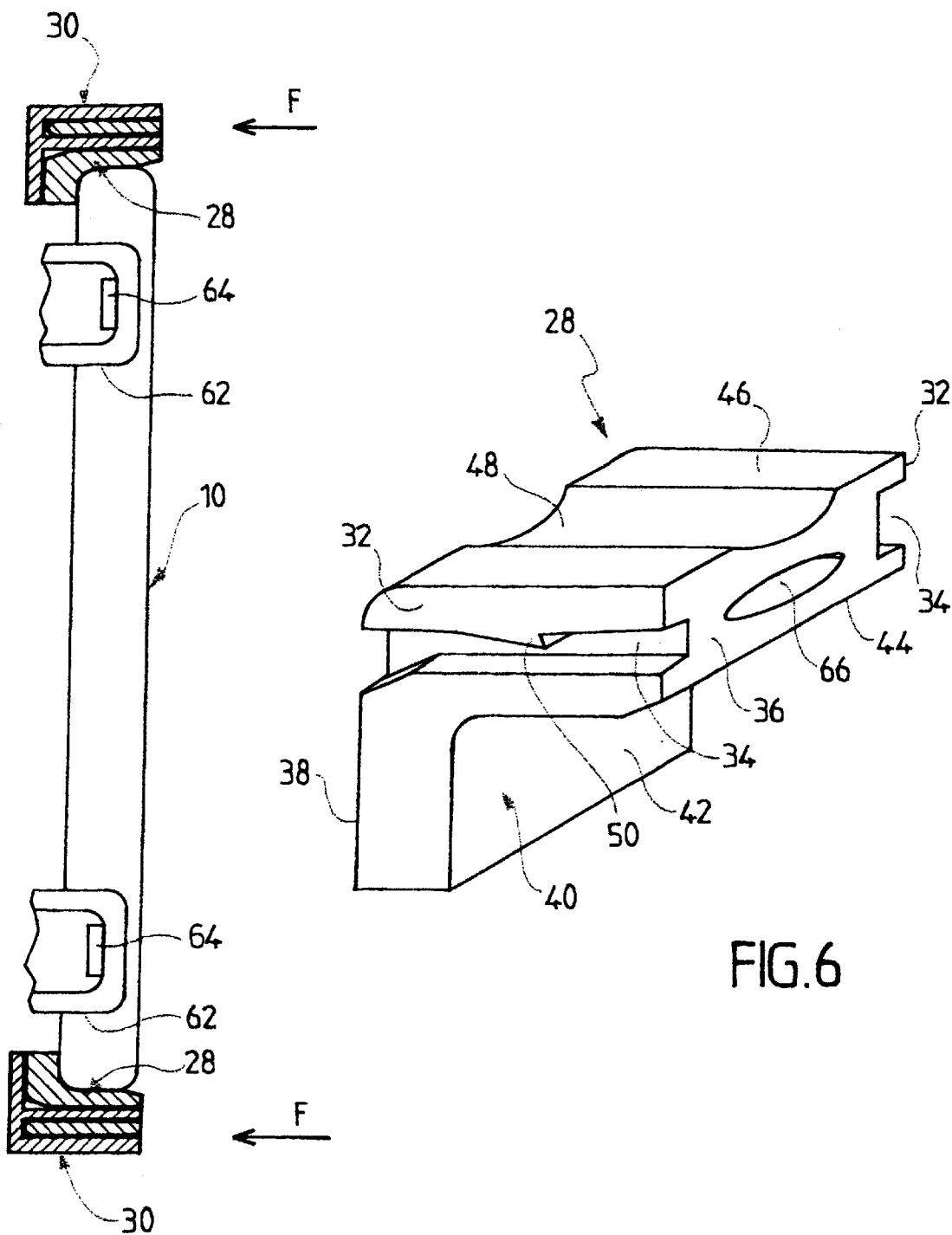
FIG. 5 is a sectional view along the line V—V of FIG. 4.
FIG. 6 is a view in perspective of a damping stud in an embodiment variant.

The other three receiving blocks 30 are of similar shape and are configured in such a way that their respective ribs 54 are parallel to each other so as to define a common mounting direction, as represented by the arrows F in FIG. 5.

In order to fit the heat exchanger, first of all the four receiving studs 28 are put in place then the module 10 is engaged by force, such that the respective manifolds 16 and 18 of the module come to bear against the corresponding bearing faces of the studs, each bearing face being formed by the face 42 and the face 44 of the said stud.

In order to complete the fixing of the heat exchanger, the load-bearing structure comprises four clipping lugs 62, grouped together in pairs on the uprights 24.

These clipping lugs protrude from the uprights and each interact with a boss 64 projecting from the manifolds of the cooling module (FIG. 5).

Thus the cooling module is mounted perfectly on the load-bearing structure with damping, avoiding the transmission of vibration, while being retained by the lugs 62 in its permanent position.

The mounting and the fixing of the cooling module take place under particularly simple conditions, without requiring specific tooling.

In the variant embodiment of FIG. 6, the damping stud 28 further comprises a central recess 66 opening out on the front face 36 and the rear face 38 and suitable for increasing the flexibility of the damping stud in at least one chosen region.

Clearly, the invention is not limited to the embodiment described above by way of example and extends to other variants.

It will be understood that the configuration of the damping studs should be matched to that of the equipment to be mounted and that the same is true for the receiving blocks 30.

Although, in theory, the equipment can be held by only three damping studs interacting with three damping studs, it is preferred, in the majority of cases, to use four damping studs engaged in four receiving blocks, in order to improve the behavior of the equipment.

Moreover, although in the example described the load-bearing structure consists of a front facade, it is possible to provide for the receiving blocks to be carried by two crosspieces directly forming part of the structure or of the body shell of the vehicle.

What we claim is:

1. A device for mounting equipment, in a heat-exchange module, onto a load-bearing structure of a motor vehicle, which comprises at least two receiving blocks provided on the load-bearing structure and each comprising two face-to-face parallel ribs, as well as at least two damping studs each of which is produced from an elastically deformable material and includes two parallel grooves opening out on two opposite side faces and able to interact, by sliding, with the two parallel ribs of a receiving block, each damping stud further comprising a bearing face suitable for interacting with the equipment and an abutment face suitable for interacting with the receiving block, wherein retaining means is provided one at least one of the damping studs and receiving blocks to immobilize the damping studs with respect to the receiving blocks.

2. The device of claim 1, wherein the damping stud comprises a body in which the grooves are formed, and a lateral elongation attached to the body and contributing to defining the bearing face and the abutment face.

3. The device of claim 1, wherein the grooves of the damping stud and the ribs of the receiving block have cross sections of complementary shapes and are suitable for frictional interaction.

4. The device of claim 1, wherein at least one of the damping studs comprises at least one recess suitable for increasing the flexibility in at least one region of said damping studs.

5. The device of claim 1, wherein at least one of the damping studs is formed from a material chosen from the group consisting of rubber and elastomer.

6. The device of claim 1, which comprises at least one first receiving block provided on an upper crosspiece of the load-bearing structure and at least one second receiving block provided on a lower crosspiece of the load-bearing structure.

7. The device of claim 6, wherein the upper crosspiece and the lower crosspiece form part of a front facade.

8. The device of claim 1, wherein said at least two receiving blocks comprises four receiving blocks the respective ribs of which are parallel and wherein said at least two damping studs comprises four damping studs suitable for interacting respectively with said four receiving blocks.

9. The device of claim 1, which further comprises means for fixing the equipment to the load-bearing structure.

10. The device of claim 9, wherein the fixing means comprise clipping lugs projecting from the load-bearing structure and interacting with complementary parts projecting from the equipment.

11. The device of claim 1, wherein retaining means is provided one at least one of the damping studs and receiving blocks to immobilize the damping studs with respect to the receiving blocks.

12. A device for mounting equipment, in a heat-exchange module, onto a load-bearing structure of a motor vehicle, which comprises at least two receiving blocks provided on the load-bearing structure and each comprising two face-to-face parallel ribs, as well as at least two damping studs each of which is produced from an elastically deformable material and includes two parallel grooves opening out on two opposite side faces and able to interact, by sliding, with the two parallel ribs of a receiving block, each damping stud further comprising a bearing face suitable for interacting with the equipment and an abutment face suitable for interacting with the receiving block, wherein at least one of the damping studs comprises a retaining tooth formed as a projection in a groove and able to come to bear against a rib of at least one of the receiving blocks in order to contribute to immobilizing the damping stud with respect to the receiving block.

13. A device for mounting equipment, in a heat-exchange module, onto a load-bearing structure of a motor vehicle, which comprises at least two receiving blocks provided on the load-bearing structure and each comprising two face-to-face parallel ribs, as well as at least two damping studs each of which is produced from an elastically deformable material and includes two parallel grooves opening out on two opposite side faces and able to interact, by sliding, with the two parallel ribs of a receiving block, each damping stud further comprising a bearing face suitable for interacting with the equipment and an abutment face suitable for interacting with the receiving block, wherein the two ribs of the receiving block are attached to two opposite side walls, suitable for framing the two opposite side faces, of at least one of said damping studs, and wherein the two opposite side walls of the receiving block are attached perpendicularly to a back wall which forms an abutment for the damping stud.

14. The device as claimed in claim 13, wherein the two opposite side walls of the receiving block are attached to a third side wall, which is itself attached perpendicularly to the back wall.

* * * * *